Dec. 29, 1959
D. LABINO
2,919,221
METHOD FOR MAKING GLASS PAPER
Original Filed Sept. 17, 1951
4 Sheets-Sheet 1
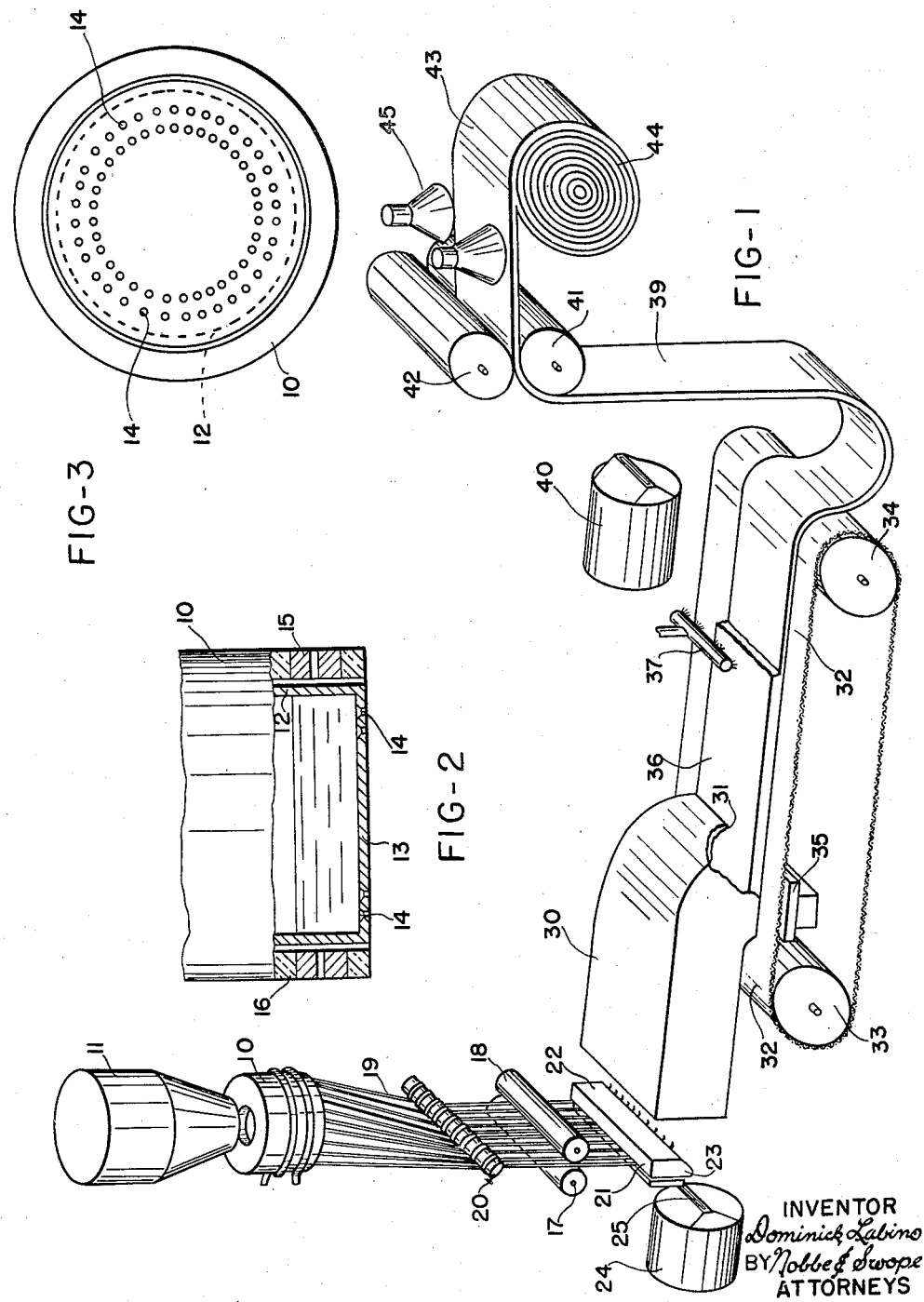
INVENTOR
Dominick Labino
BY Nobbe & Swope
ATTORNEYS Dec. 29, 1959
D. LABINO
2,919,221
METHOD FOR MAKING GLASS PAPER
Original Filed Sept. 17, 1951
4 Sheets-Sheet 2
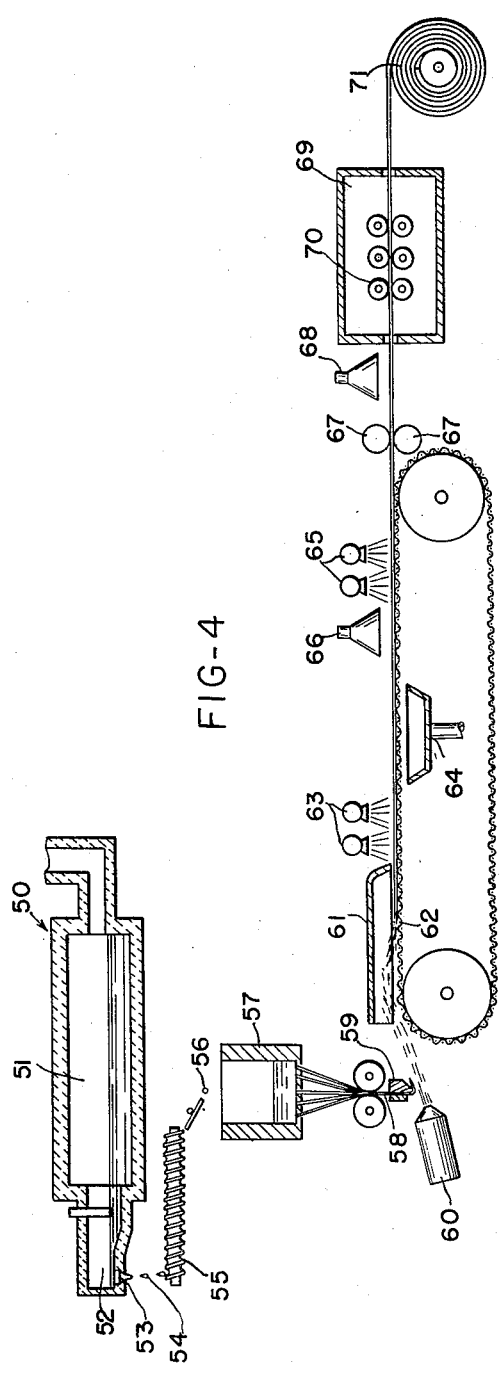
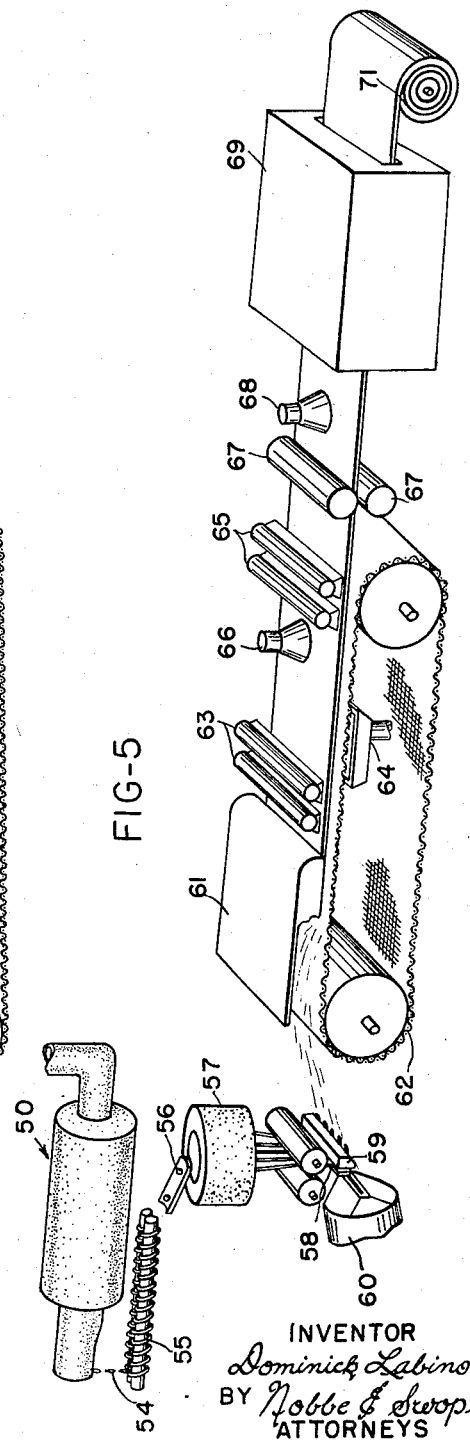
INVENTOR
Dominick Labino
BY Nobbe & Swope
ATTORNEYS Dec. 29, 1959 D. LABINO 2,919,221
METHOD FOR MAKING GLASS PAPER
Original Filed Sept. 17, 1951 4 Sheets-Sheet 3
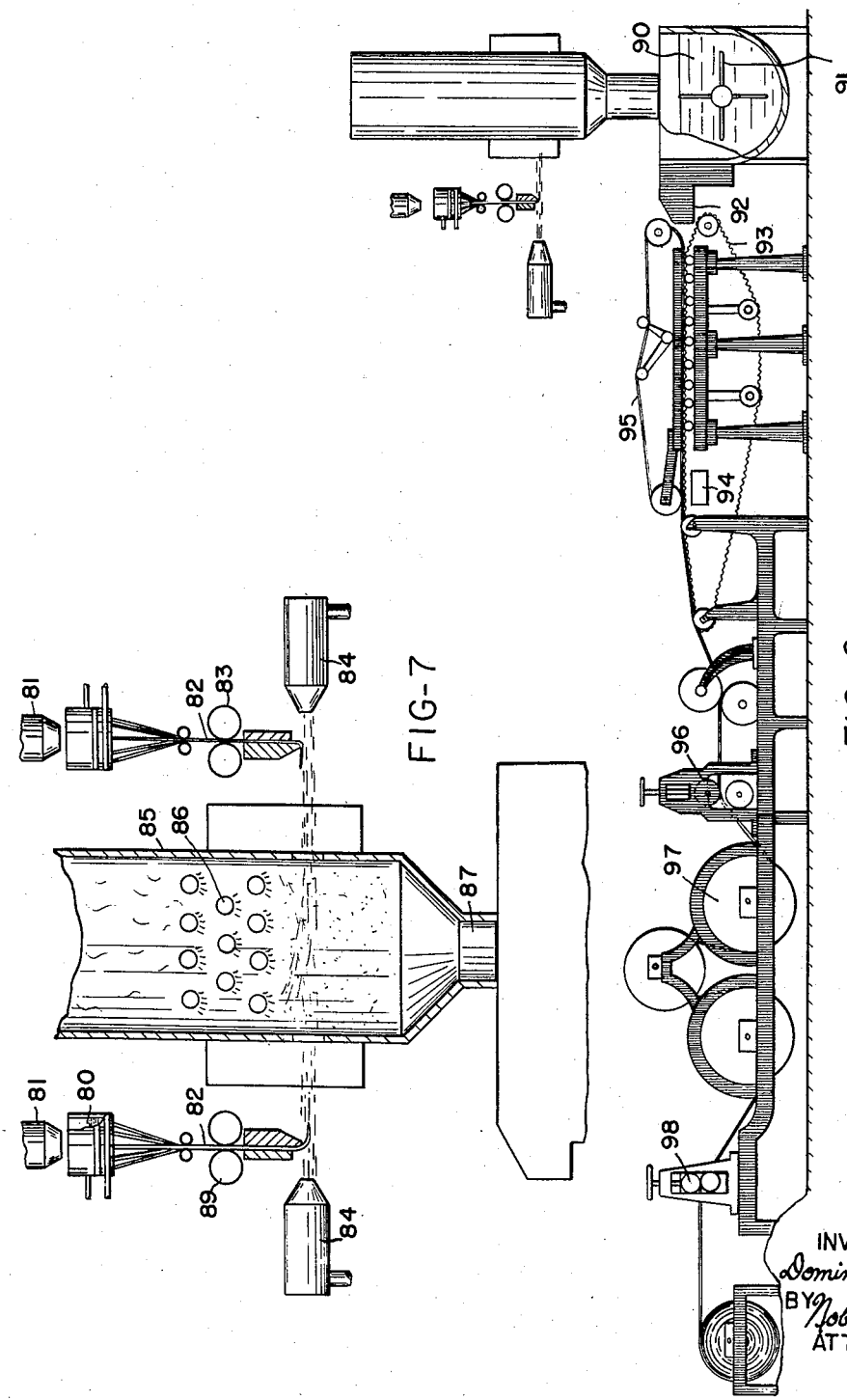
INVENTOR
Dominick Labino
BY Hobbs & Swope
ATTORNEYS

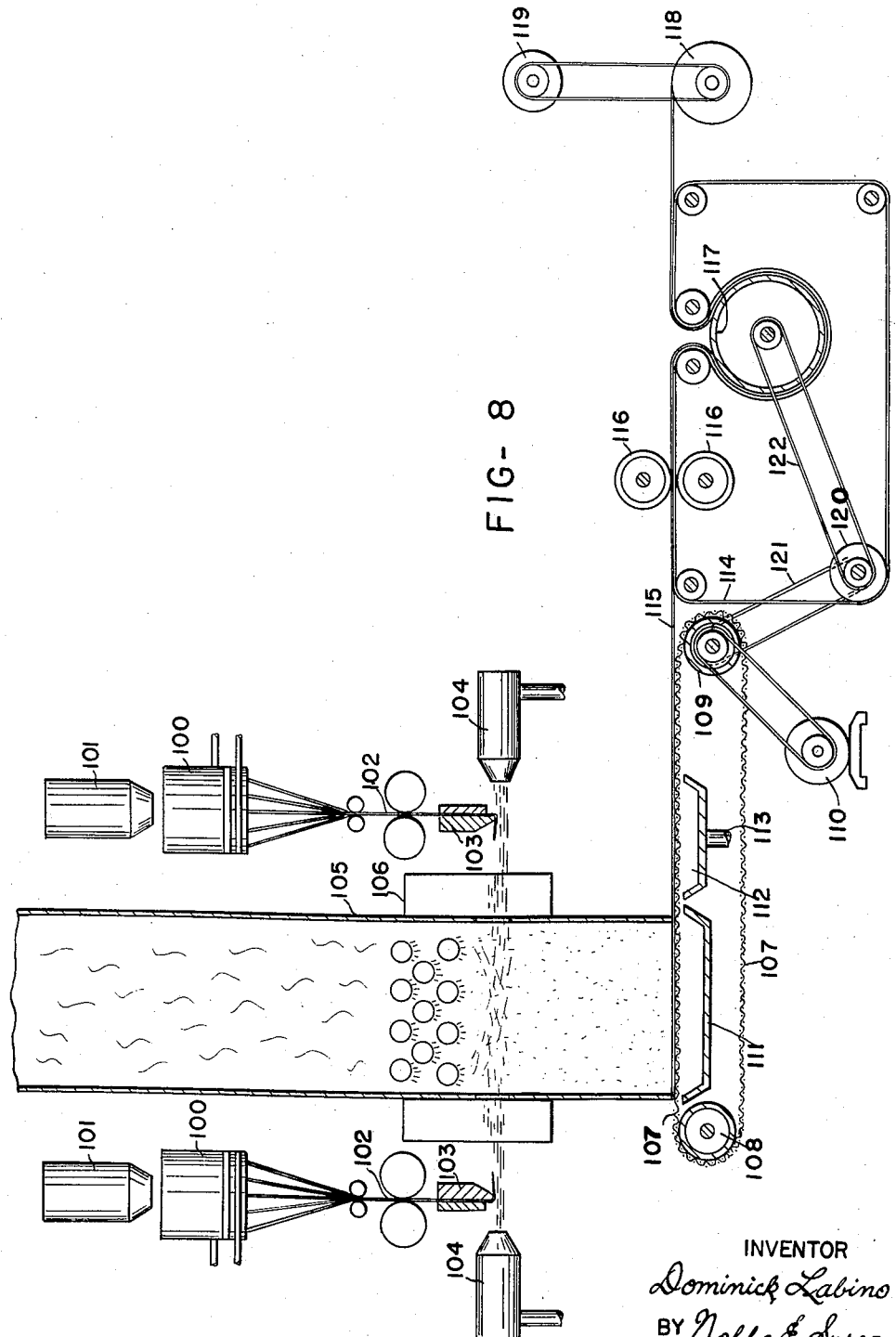

United States Patent Office 2,919,221
Patented Dec. 29, 1959

2,919,221

METHOD FOR MAKING GLASS PAPER

Dominick Labino, Maumee, Ohio, assignor to L-O-F Glass Fibers Company, Toledo, Ohio, a corporation of Ohio Continuation of application Serial No. 247,010, September 17, 1951. This application January 13, 1956, Serial No. 559,073

6 Claims. (Cl. 162—156)

This invention relates to methods and apparatus for producing as a new article of manufacture a glass paper.

This application is a continuation of my copending application Serial No. 247,010, filed September 17, 1951, now abandoned.

Paper consisting of glass fiber has heretofore been unknown in the art. Attempts made to produce glass paper have resulted in failure because of the lack of any tensile strength in the material produced which rendered it useless as a paper in the many uses to which paper is adapted. Further, the material produced lacked surface finish and hardness, making it unsuitable for use as paper.

However, I have discovered that fine glass fibers of uniform diameter, on the order of one micron and less, mat or felt together with self-adhesion to an extent that good tensile strength is imparted to the product produced and that a smooth, hard surface finish can be given to the material, thereby making it satisfactory for use as paper. With the glass fibers having uniformity of diameter and uniformity of length, extreme uniformity of the paper is obtained.

Paper made of glass fibers according to this invention has characteristics that are not capable of reproduction in papers made from natural fibers, thus making glass paper adaptable for special purpose applications in which papers made from natural fibers cannot be used. For example, electronic components in which insulating papers are used are limited to a top temperature value of about 85° C., principally because of the destruction of the paper base of the component under heat. Thus, a paper made of glass fibers will permit of higher temperature elevation of electronic components because the basic fiber does not deterioriate at low temperature.

Glass paper also has a very low coefficient of expansion which eliminates difficulties resulting from expansion and contraction and since the glass fibers are nonhydroscopic, there is no change in dimensional size resulting from changes in moisture content of the paper. These characteristics are useful in the printing industry. Also, with the glass paper having a hard smooth surface, it is capable of receiving writing and printing.

Attempts at making papers from other synthetic fibers have resulted in products unsuitable for many uses to which paper is adapted as the synthetic fibers have required bonding, either by plasticizing the fibers slightly, or bonding has been obtained by the use of synthetic binders. Papers of this nature, however, are still highly susceptible to deterioration by heat or the bonding agent introduces a foreign substance into the paper which is subject to deterioration or makes it undesirable for use in special applications. The bonding together of smooth surfaced synthetic fibers has, therefore, been a substantial problem in any attempt to produce a true paper from fibers other than natural fibers.

It has been discovered, however, that when glass fibers are produced with diameters such that they approach dimensions of particles of colloidal suspensions, that the glass fibers when placed in a thin mat exhibit characteristics entirely different from those exhibited by glass fibers of larger diameter when placed in mat form. That is to say, that when glass fibers having a diameter of about one micron or less are arranged in a thin mat form, the fibers exhibit felting or matting characteristics and characteristics of surface adhesion that result in a physical interlocking of the fibers together to an extent that a matted or felted web of such glass fibers exhibits substantial tensile strength. This is probably brought about because of the great surface area to weight ratio of the extremely fine glass fibers. The surface area of such fine fibers in a web of any density is so great that there is an actual surface adhesion between the fibers. Also, this result is occasioned because of the diameter to length ratio of the fibers wherein the length of the fiber is 500 to 1000 times the diameter resulting in extreme flexibility of the fiber which permits it to mechanically interlock with the other fibers of like diameter and length.

Also, unlike natural fibers, glass fibers, when properly manufactured, are given the characteristics of uniform diameter and substantially uniform length. Thus a paper made from glass fiber of uniform diameter, and if desired, of uniform length, exhibits uniform physical, electrical and chemical characteristics as distinguished from non-uniform characteristics of paper made from natural fibers because of the varying diameter and length of the natural fibers.

It is, therefore, an object of this invention to provide a method and apparatus for producing paper from glass fibers, and particularly to produce paper having good tensile strength and which will have uniform physical, electrical and chemical characteristics.

It is another object of the invention to provide a method and apparatus for producing glass paper of the kind referred to in the foregoing object wherein the paper is composed of glass fibers having a diameter of substantially one micron or less wherein the fiber diameters approach uniformity and wherein, if desired, the length of the fibers also approach uniformity.

It is a further object of the invention to provide a method of making glass paper wherein glass fibers having a diameter of substantially one micron or less are used and the diameter of the glass fibers is held within a range of 0.1 to 1.0 micron.

It is still another object of the invention to provide a method of making a glass paper having a low density as compared with comparable paper made from natural fibers but having a high tensile strength.

It is thus an object of this invention to provide a heat, acid and alkali resistant paper of glass fibers of uniform diameter and, if desired, of uniform length, and of constant physical, dielectric, color and chemical characteristics capable of self-adhesion in mat form.

It is also an object of this invention to provide a method of producing glass paper by which an acid water is used.

These and other objects will be apparent from the drawings and the following description.

In the drawings:

Figure 1 is a diagrammatic representation of apparatus for manufacturing glass paper according to the method of this invention;

Figure 2 is a cross-sectional view through the glass melting chamber of the apparatus of Figure 1;

Figure 3 is a bottom view of the heating chamber of Figure 2;

Figure 4 is a diagrammatic representation of other apparatus for producing glass paper according to the method of this invention and including apparatus for modifying the glass paper during manufacture;

Figure 5 is a diagrammatic perspective view of the apparatus illustrated in Figure 4;

Figure 6 is a diagrammatic representation of apparatus for producing glass paper according to the method of this invention as applied to standard paper-making machinery;

Figure 7 is a cross-sectional view of the glass fiber collecting apparatus of Figure 6; and Figure 8 is a diagrammatic representation of a modified arrangement of apparatus for producing glass paper according to the method of this invention.

In the manufacture of paper from natural fibers, such as those from the various celluloses, it is recognized in the art that a wide variation in quality of a paper product results from the unpredictable variations in natural fibers. Thus, quality control of papers made from natural fibers is one of the major factors that must be constantly watched and regulated during production of paper. This is particularly true in the production of papers for special applications where uniform quality and physical characteristics of the paper must be carefully retained so as to secure as nearly as possible uniform characteristics in the products in which the paper is used. One such example is paper products for the electronics industry wherein the uniformity of quality of the paper, such as dielectric property, is a major factor in determining whether the electrical components using the paper will have uniform electrical characteristics. There are, of course, many other applications in which uniform quality control of paper is a major factor.

Because of the wide variation in the diameter and length of natural fibers, and because of the inherent natural variation of the fibers themselves, a wide variation in quality of the papers made from such fibers results, such as in physical, chemical and electrical characteristics. The variations in the paper are carried into the electrical components, for example, in which the paper is used, and there is no satisfactory way to overcome the inherent natural variations in the characteristics of the paper made from natural fibers.

A paper made from fibers having uniform diameter and length is capable of exhibiting uniform physical, chemical and electrical characteristics. Such a paper is that which can be made from glass fibers according to this invention, the glass fibers having uniform diameter of substantially one micron or less. In any paper made from such glass fibers, the micron diameter size of the fiber from which the paper is made is preestablished and the variation from the established micron size is not permitted to vary more than ±.45 micron. Thus, there is established a uniformity of diameter of the glass fibers that has heretofore been unobtainable in synthetic fibers of any kind, including glass fibers.

In the method of this invention glass fibers having a diameter of substantially one micron or less are produced under controlled conditions such that the fiber diameter does not vary more than ±.45 micron from an established micron size. Also, the length of the glass fiber may be held to uniform length if desired. Hence, glass paper made from such fiber exhibits highly uniform physical, chemical and electrical characteristics, such as tensile strength, chemical resistance and dielectric properties.

Thus, as a filtering medium, paper made of glass fibers having uniform diameter of micron size or less is superior to filter media made from natural fiber because of the uniformity of the interstices between the glass fibers. Because of the smallness of the interstices between the glass fibers, an extremely efficient filtering medium is produced, in fact one that filters smoke from the air.

The glass paper made according to this invention is highly absorbent to liquid and as a result can be saturated with various resins to give to the paper special physical or electrical properties. In fact, such papers have demonstrated their ability to take up as much as twenty-one times their own weight of the saturating solution.

It has been discovered that glass fibers having a diameter of about one micron or less disperse uniformly in a fluid carrier, either air or liquid, and when in the liquid, they are much the same as a colloidal solution. Thus, a fluid carrier containing glass fibers of a diameter of one micron or less is homogeneous in nature so that the fibers can be separated from the fluid in a uniform homogeneous mass with resultant uniformity of density of the collected mass of glass fibers.

If the uniformity of diameter of glass fibers is not retained within the ±.45 micron range, the paper resulting from use of such non-uniform fibers exhibits the same objectionable variations in physical, chemical and electrical characteristics as that exhibited in papers made from natural fibers. Hence, uniformity of diameter of the glass fibers is of critical importance in the manufacture of a glass paper having uniform physical, chemical and electrical characteristics. Preferably also, the glass fibers shall be substantially of the same length.

Glass fibers having a diameter of one micron or less when incorporated into a paper exhibit the characteristic of self-adhesion, even though the surface of the glass fibers is entirely smooth, resulting in a glass paper having substantial tensile strength. This self-adhesion of the glass fibers is occasioned merely by wetting the fiber with water and collecting the wet fiber as a web or sheet, or the fiber can be collected in a dry form and thereafter wet with water. No binder whatever is necessary to secure the self-adhesion of the glass fibers. A paper made from water wet fibers exhibits good tensile strength and uniformity of structure.

The self-adhesion is greatly increased by wetting the fiber with an acid water. It has been discovered that each glass of a different glass composition and a different alkaline content has a critical pH value of the water with which it works best. The effect of the correct pH value of the water made acid by any of the common acids, such as hydrochloric and sulphuric for example, is that of obtaining a much greater and a more even dispersion of the glass fiber in the water. The effect is much the same as would be occasioned by the use of a greatly increased quantity of water to disperse the same amount of glass fiber. Also, a more uniform dispersion is obtained to an extent that less bunching of the fibers occurs in the water and the fibers seem to repel one another whereby each fiber is separately dispersed in the water.

It has been discovered that as the alkaline content of the glass is lowered, the acidity of the water in which the glass is dispersed must be increased. Fibers made from a high alkaline glass disperse readily in an acid water having a pH value of about 6.0, whereas the fiber made from a low alkaline glass disperses in the water only when the pH value of the water is reduced to a value in the neighborhood of 2.0. Thus the acid content of the water is inversely proportional to the alkaline content of the glass.

Tests performed on fibers of medium alkaline content show the best dispersion of the fiber in the water when the pH value of the water is about 3.5. As the pH value of the water is decreased to about 5.0 or increased to about 2.5, the uniformity of dispersion of the fiber in the water gradually decreases so that a pH range of approximately 2.5 is established relative to the critical pH or the preferable pH for the water for any glass of a particular alkalinity.

For example, in a glass having a low alkaline content, such as ½% of sodium or potassium, the critical pH of the water to obtain maximum dispersion of the glass fiber is around 2.0, whereas in a glass of high alkaline content, containing 20% sodium or potassium content for example, the critical pH value of the water obtaining maximum dispersion of the glass fiber in the water is about 6.0. Thus the acid content of the water is inversely proportional to the alkaline content of the glass. In any event, the pH range of the water from the critical value is not more than 1.5 on either side of the critical value.

Tests have shown that when glass fiber in the micron range is wet with an acid water and paper formed therefrom that the tensile strength of the paper is increased at least three times over that wet with an ordinary tap water over which no control has been maintained of the pH value in relation to the alkaline content of the glass.

When the fibers are wet with a liquid they compact and felt into a self-adherent pulp-like mass which when dried gives a paper product of good tensile strength. Also, the self-adherent mass can be pressed while wet under any desired pressure which increases the tensile strength of paper product so produced.

To obtain glass fibers of a uniform diameter of one micron or less and retain the diameter of the fibers within a range of ±.45 micron, the conditions under which the glass fibers are produced are critical to the extent that conditions once established must thereafter be maintained constant to hold the sub-micron diameter of the fiber constant. The glass fiber is of the class known as staple fiber, but the diameter to length ratio is exceedingly high with the sub-micron diameter of the fiber providing for extreme flexibility and mechanical strength of the fiber.

In Figures 1 and 2 there is illustrated an apparatus for obtaining glass fibers of one micron in diameter or less and for producing paper from such fiber. In Figure 1 there is illustrated a heating and melting chamber 10 into which glass marbles are fed from a supply hopper 11. The glass marbles are fed into the heating and melting chamber 10 at periodic intervals governed by the rate of removal of glass from the heating and melting chamber. Since the marbles are approximately ½" in diameter and the heating and melting chamber 10 is approximately 5" in diameter, with the molten glass mass about 2.5" deep, the level of molten glass in the heating and melting chamber is maintained at a constant level since the small amount of glass added by the dropping of a marble into the body of molten glass in the heating and melting chamber is insufficient to cause any noticeable effect on the level of the molten glass in view of the small volume of the marble relative to the volume of the molten glass in the heating and melting chamber.

The heating and melting chamber 10 is more particularly illustrated in Figure 2 wherein it is illustrated as consisting of an inner metal chamber 12 that is circular or cylindrical in shape. The chamber 12 is preferably constructed of platinum to resist the action of the molten glass contained within the chamber.

The bottom wall 13 of the chamber 12 contains a plurality of openings 14 through which molten glass exudes from the chamber 12. These openings 14 are arranged in circular rows near the periphery of the chamber 12 as illustrated in Figure 3. A heating coil 15 is placed around the exterior of the chamber 12 and is adapted for connection to a source of high frequency energy which may, for example, be an electronic high frequency oscillator, or a high frequency generator. The heating coil 15 is placed substantially at the glass melting level of the molten glass in the chamber 12 to effect uniform heating conditions throughout the body of the molten glass in the heating chamber or pot 10. The heating chamber 12 is preferably surrounded with a ceramic heat insulating material 16 to conserve heat therein.

It has been determined over a long period of experimentation and manufacture of glass fibers that the heating of glass by the use of a high frequency current in a heating coil that is placed around a circular heating chamber and positioned uniformly around the chamber results in obtaining absolute uniformity of viscosity of the molten glass throughout its entire mass within the heating chamber.

With the level of the molten glass maintained constant within the heating chamber 12 and with the viscosity of the molten glass absolutely uniform throughout the entire mass thereof, there is effected identically the same head of glass above each opening 14 in the bottom wall of the heating chamber 12 at a voscisity of exactly the same as that which occurs in the head of glass above every opening in the bottom wall of the heating chamber. The head of glass above each of the openings is exactly the same because of the parallel placement of the bottom wall of the heating chamber relative to the level of molten glass therein. As a result, exactly the same quantity of molten glass is exuded through each of the openings 14 from the heating chamber 12.

The head of glass above the openings 14 establishes a uniform pressure differential between opposite sides of the body of the glass to cause the glass to exude through each of the openings at a constant rate in constant volume. However, a positive pressure can be established above the body of molten glass in the chamber 12 should it be desirable to obtain a flow rate of the molten glass through the openings 14 greater than that occasioned by the normal head.

The stream of molten glass from the chamber 12 cool quickly so that solidified glass fibers can be passed between the drawing rolls 17 and 18 for drawing of the molten glass as it leaves the chamber 12 into the fine fibers that pass between the drawing rolls 17 and 18. The glass fibers 19 pass over a guide 20 having a recess to receive each of the fibers whereby the fibers are arranged in planar relationship for entry to between the drawing rolls 17 and 18. The drawing rolls are preferably of a rubber-like material to frictionally engage the glass fibers 19 whereby to pull them downwardly from the heating chamber 12.

The drawing rolls 17 and 18 are driven by a suitable mechanical apparatus to rotate them at constant speed which is controlled to establish the diameter of the drawn glass fiber 19 at a predetermined and fixed value, for example, 0.005 to 0.007 inch.

With the flow of molten glass from the heating chamber 12 being at a uniform controlled rate from each of the openings 14, and with the drawing rolls 17 and 18 simultaneously drawing each of the molten strands into glass fiber from molten glass of exactly the same viscosity flowing at exactly the same rate, the drawn diameter of each of the primary glass fibers 19 will be exactly the same within but very minor limits of .0005 inch.

The primary glass fibers 19 are advanced by the drawing rolls 17 and 18 over the flat face 21 of a guide block 22 having a V-shaped edge 23.

In horizontal alignment with the V-shaped edge 23, there is provided a gas burner 24 that has a horizontal discharge slot 25 through which a high temperature high velocity gas blast is discharged directly at the ends of the glass fibers 19 below the edge 23 of the block 22. The high temperature gas blast melts the ends of the fibers 19 and the high velocity of the blast causes the molten glass from each of the fibers 19 to be blown from the end of the fiber and simultaneously therewith drawn into a glass fiber of extremely fine diameter of one micron or less.

With the primary glass fibers 19 having a diameter of from 0.002 to 0.007 inch, and with the high temperature high velocity gas blast having a temperature of 3300° F. or higher and a velocity of 1600–2000 ft./sec., glass fibers of 0.04 to 1.0 micron in diameter are produced.

By controlling the diameter of the primary glass fiber 19, the rate of feed, temperature and velocity of the burner gas at discharge slot 25, the diameter of the drawn staple fiber can be varied.

With the primary glass fibers 19 being fed uniformly into a burner blast of uniform temperature and velocity, the ends of the primary glass fibers are all rendered molten at the same rate with the result that the staple fiber blown from the ends of the primary glass fibers is of relatively uniform length, as well as being uniform in diameter.

Thus, under controlled conditions, staple fiber having a diameter of one micron or less can be obtained with controlled uniformity of diameter and length of the staple fiber.

The staple glass fiber thus formed is directed into a collecting hood 30 that has a horizontally disposed opening 31 positioned directly above a fine mesh wire belt 32. The belt 32 is carried between rolls 33 and 34, and either of the rolls can be suitably driven whereby to drive the belt 32. A suction box 35 is placed beneath the upper portion of the belt 32, and beneath the opening 31 in the hood 30, and is adapted to be connected to any suitable apparatus for lowering the pressure in the box 35.

The suction box 35 draws the fine glass fibers directed into the hood onto the belt 32 which builds up into a loose mat 36 that is delivered from the hood 30, the thickness of the mat being governed by the speed of forward advancement of the belt 32 and the rate of collection of the glass fibers on the belt.

The staple glass fiber of micron size or less uniformly disperses itself in a fluid medium, such as, gas or liquid. This uniform dispersion of the glass fibers in the fluid medium results in a homogeneous flow of the fluid and glass fibers thereby causing uniform distribution of the glass fibers as collected upon the wire belt 32 under the hood 30. The final result is that a loose mat of glass fibers of micron diameter or less is produced that is of uniform density throughout the entire structure of the mat.

As the loose fibrous mat advances from the hood 30, a liquid spray 37, such as a water spray, is applied to the loose mat thereby condensing the loose fibrous mat into a wet felted mat of considerably less thickness. The wetting of the glass fibers of micron diameter or less causes them to compact and felt into a homogeneous web structure of sufficient tensile strength that the wet felted web structure supports itself and has substantial resistance to physical separation which allows the web to be handled in its wet condition.

The wet felted web is then treated to have the excess water removed from it as by applying heat to the web by means of a gas burner 40 to drive the water from the web. While in this wet condition and partially dried, the felted web 39 can be passed between press rolls to reduce the thickness of the paper thus formed.

If desired, after the paper leaves the press rolls 41 and 42, additional heat can be applied to the paper 43 to thoroughly dry the same, such as, by way of heat lamps 45.

As one example of production of glass paper according to the method of this invention, glass was melted in a heating chamber at a temperature of approximately 2650° F. The primary glass fibers were drawn to a diameter from 0.002 to 0.007". These primary glass fibers were advanced into a burner flame having a temperature of approximately 3300° F. with a blast velocity of 1600–2000 ft./sec. whereby staple glass fiber of a diameter of 0.04 to 1.0 micron with a length of from 1/8" to 3/8" was produced.

The staple glass fibers so produced were collected on a wire belt with the dry loose glass fiber being collected on the belt in a mat thickness of about 1/8" under a suction of 10 to 14" of water applied to the under side of the belt in the area on which the fiber is collected. This loose web or mat of glass fibers was wet with a water spray to compact the mat to a thickness of approximately 0.005". The compacted web of glass fiber was then heated to drive off excess moisture and while still damp was directed under a light weight roller.

The paper produced as a result of this method had a thickness of 0.005", a density of .22 gr./cc., and a melting point of 1550° F. The paper exhibited a tensile strength in the dry condition of 220 p.s.i. and in the wet condition of 1150 p.s.i.

The superior characteristics exhibited by paper products according to the method of this invention is considered to be solely the result of uniformity of diameter of glass fibers of micron diameter and less, and uniformity of length of the fibers.

In Figures 4 and 5, there is illustrated another form of apparatus for performing the method of this invention. In this apparatus there is disclosed a glass-making furnace 50 having a glass-making chamber 51 in which raw materials are heated and melted. The molten glass prepared in the furnace chamber 51 advances to the fore-hearth 52 that has the discharge opening 53 therein. Slugs 54 of molten glass are cut from a glass stream flowing from the opening 53, which slugs drop upon the rolls 55 in a marble-making machine. The marbles 56 are supplied periodically to the heating and melting chamber 57 from which primary glass fibers 58 are produced in the same manner as heretofore disclosed and described with reference to the apparatus of Figure 1.

The primary glass fibers 58 are fed against a guide bar 59.

A gas burner 60 discharges its gas blast against the ends of the primary glass fibers 58 to form staple glass fiber of micron diameter or less in the same manner as heretofore disclosed and described with reference to Figure 1.

The staple glass fiber thus formed is blown into a hood 61 placed over a fine mesh wire belt 62 thereby producing a loose mat of uniform density of glass fibers having controlled micron diameter size. The loose mat of glass fiber so produced is wet with water sprays 63 to condense and felt the fibers into a felted mat in the same manner as heretofore described with reference to Figure 1.

Excess water is removed from the wet felted web through a suction box 64.

In certain uses of glass paper, it is desirable that additional materials be added to the glass fiber paper, for example, in electronic components, such as, condensers, wire insulation, slot-armour and others. Suitable additives, such as the various synthetic resins, varnishes and colloidal dispersions can be applied to the glass paper and thoroughly incorporated with it because of the high liquid absorption fo the paper. The paper can be saturated with suitable additives either during making of the paper or after the paper has been completely formed and dried.

In Figures 4 and 5, there is illustrated the spray heads 65 through which suitable liquids can be added to the condensed felted web. When the additives are supplied to the web while it is still wet with water, the additives are preferably aqueous solutions, or the resins can be of a type that would not be affected by the water in the web.

If the additives are not compatible with water, then the felted web can be dried by the heat lamps 66 before the additives are supplied to the felted web.

The so-treated felted web can then be passed through press rolls 67 to compress the web to the desired density and dried under heat of the heat lamps 68. The heat from the lamps 68 may suffice to polymerize the resin added to the web, but if not, the web can be passed through a heating chamber 69 and further compressed by the press rolls 70, if desired. The finished paper web is wound into a roll 71.

In Figures 6 and 7, there is illustrated another arrangement of apparatus for performing the method of making paper according to this invention wherein the staple glass fiber of micron diameter and less is supplied directly to the pulp vat or chest of a standard paper-making machine with the result that the glass fiber is handled by the paper-making machine in the same manner as in the production of paper from natural fibers, but wherein the special characteristics of the glass paper attributable to the uniformity of the glass fibers is incorporated into the glass paper.

In the arrangement of Figures 6 and 7, there is provided apparatus for producing staple glass fiber of micron diameter and less in the same manner as heretofore disclosed and described with reference to Figure 1. The apparatus consists of a melting chamber 80 supplied with marbles from a hopper 81. The primary glass fibers 82 are drawn and attenuated by the rolls 83 in the same manner as heretofore disclosed and described in the corresponding apparatus of Figure 1.

The primary glass fibers 82 are heated and melted by a high temperature high velocity blast from the gas burner 84, causing production of staple glass fiber of micron diameter and less in the same manner as heretofore disclosed and described with reference to Figure 1.

The staple glass fiber of micron diameter and less so produced is directed into a vertically arranged hood 85 that has a battery of water sprays 86 placed therein for causing a downward spray of water onto the staple glass fiber delivered into the hood 85. The water sprays will wet the glass fiber and carry it downwardly through the discharge opening 87 and thence into the pulp vat or chest 90 of a paper-making machine. The gases entering the hood 85 will exhaust upwardly from the hood, but the glass fibers will be washed from the exhausting gases by the water sprays 86. To supply sufficient glass fiber to maintain operation of a paper-making machine, a battery of staple glass fiber producing units may be located around the hood 85 to greatly increase the quantity of glass fiber produced and supplied to the pulp vat 90.

Water in sufficient volume is supplied to the pulp vat 90 and the glass fiber and water are continuously mixed by the stirrer 91 provided in the pulp vat. Since glass fiber of micron diameter and less disperses uniformly throughout a liquid in much the same manner as colloidal particles, a homogeneous solution of water and glass fiber flows from the head box 92 onto the wire 93 of a Fourdrinier type paper-making machine.

The wire 93 of the Fourdrinier paper-making machine passes over a vacuum box 94 to remove excess water from the pulp on the wire, the width of the web being controlled by the deckle straps 95. The pulp web formed on the wire 93 then passes between press rolls 96 as carried on the usual endless fabric belt which thereafter carries the web over the drier cylinders 97 and finally through finish press rolls 98.

In Figure 8, there is illustrated another modified arrangement of apparatus for producing paper according to the method of this invention. In this apparatus the mechanism for producing staple glass fiber of micron diameter and less is the same as that heretofore disclosed and described with reference to Figure 1 and consists of a heating and melting chamber 100 supplied with glass marbles from a supply hopper 101. Primary glass filaments 102 engage a guide bar 103 and staple glass fiber is blown from the ends of the melted fibers 102 by means of a gas burner 104.

The staple glass fiber of micron diameter and less is delivered into a vertically-positioned hood 105 having a battery of water sprays 106 by which the staple fiber is washed from the gases exhausting upwardly through the hood 105. The water wet staple glass fiber is discharged from the bottom of the hood 105 onto a fine wire mesh belt 107, the belt advancing at a constant rate of speed to provide for collection of fibers at a given depth over the surface area of the belt.

The belt 107 is carried on rolls 108 and 109, the roll 109 being driven by an electric motor 110. A drip pan 111 is placed beneath the lower end of the hood 105 on the under side of the upper portion of the belt 107 to collect water draining from the fiber as it is collected on the belt.

To remove excess water from the glass pulp collected on belt 107, a suction chamber 112 is provided and is connected by a pipe 113 to a suitable source of pressure reduction, such as, an inlet of a suction fan.

The glass fiber collected on the belt 107 forms into a felted web and is transferred to an endless fabric belt 114 that carries the web 115 between press rolls 116 to remove excess water from the web 115. From the press rolls 116 the wet web 115 is delivered to a drier cylinder 117 and thereafter delivered to a collecting roll 118. The roll 118 is driven by an electric motor 119.

The endless belt 114 is driven by the roll 120 by means of a belt 121 from the roll 109 and the drying cylinder 117 is driven by a belt 122 from the roll 120.

While the method and apparatus disclosed and described herein constitute preferred forms of the invention, yet it will be understood that modifications can be made without departing from the spirit of the invention, and that all modifications that fall within the scope of the appended claims are intended to be included.

I claim:

1. A method of making glass paper comprising, blasting primary fibers of glass into fibers of a length in the range between 1/8 and 3/8 inch, said fibers having a uniformity of diameter of about ±0.45 micron and a diameter not exceeding one micron, and felting said fibers into a layer of interlocked fibers.

2. A method of making glass paper comprising, blasting primary fibers of glass into fibers of a length in the range between 1/8 and 3/8 inch, said fibers having a uniformity of diameter of about ±0.45 micron and a diameter not exceeding one micron, felting said fibers into a layer of interlocked fibers, adding a liquid synthetic resin to said layer, and curing said resin.

3. A method of making glass paper comprising, blasting primary fibers of glass into fibers of a length in the range between 1/8 and 3/8 inch, said fibers having a uniformity of diameter of about ±0.45 micron and a diameter not exceeding one micron, mixing said fibers in an aqueous carrier to form a substantially homogeneous dispersion of fibers in the carrier, felting said dispersion into a thin layer of interlocked fibers, and removing water from said layer.

4. A method of making glass paper comprising, blasting primary fibers of glass of an alkali content between about 1/2 and 20% into fibers of a length in the range between 1/8 and 3/8 inch, said fibers having a uniformity of diameter of about ±0.45 micron and a diameter not greater than one micron, mixing said fibers in an aqueous carrier having a pH in the range from 2 to 6 and varying the pH inversely proportional to the alkali content of the glass, felting said dispersion into a layer of interlocked fibers, and removing water from said layer.

5. A method for making glass paper, comprising blasting primary fibers of glass into fibers having a diameter not exceeding one micron and a uniformity of diameter of about ±0.45 micron and a length in the range from 500 to 1000 times the diameter, directing said fibers into an airborne flow stream, subjecting the surfaces of the fibers while in said air-borne flow stream to the action of an aqueous spray, collecting said treated air-borne fibers as a thin layer and removing water from said layer.

6. A method of making glass paper, comprising blasting primary fibers of an alkali content between about 1/2% and 20% into fibers having a uniformity of diameter of about ±0.45 micron and a diameter not exceeding one micron and a length in the range from 500 to 1000 times the diameter, directing said fibers into an air-borne flow stream, subjecting the surfaces of the fibers while in said air-borne flow stream to the action of an aqueous spray of a pH in the range from 2 to 6 and varying the pH inversely proportionally to the alkali content of the glass, collecting said treated air-borne fibers as a thin layer, and removing water from said layer.

(References on following page)

References Cited in the file of this patent

UNITED STATES PATENTS

| | | |
|---|---|---|
| 2,489,242 | Slayter et al. | Nov. 22, 1949 |
| 2,461,841 | Nordberg | Feb. 15, 1949 |
| 2,491,761 | Parker et al. | Dec. 20, 1949 |
| 2,504,744 | Sproull et al. | Apr. 18, 1950 |
| 2,624,658 | Parker et al. | Jan. 6, 1953 |
| 2,635,390 | Parker | Apr. 21, 1953 |
| 2,643,415 | Stalego | June 30, 1953 |
| 2,658,848 | Labino | Nov. 10, 1953 |
| 2,663,903 | Stalego | Dec. 29, 1953 |
| 2,692,220 | Labino | Oct. 19, 1954 |
| 2,729,028 | Slayter et al. | Jan. 3, 1956 |

OTHER REFERENCES

Callinan et al.: "The Electrical Properties of Glass-Fiber Paper," Naval Research Laboratory Publication, May 1951.